April 4, 1944.　　　R. W. ROBBINS　　　2,345,949
LOCKING DEVICE
Filed Feb. 23, 1942
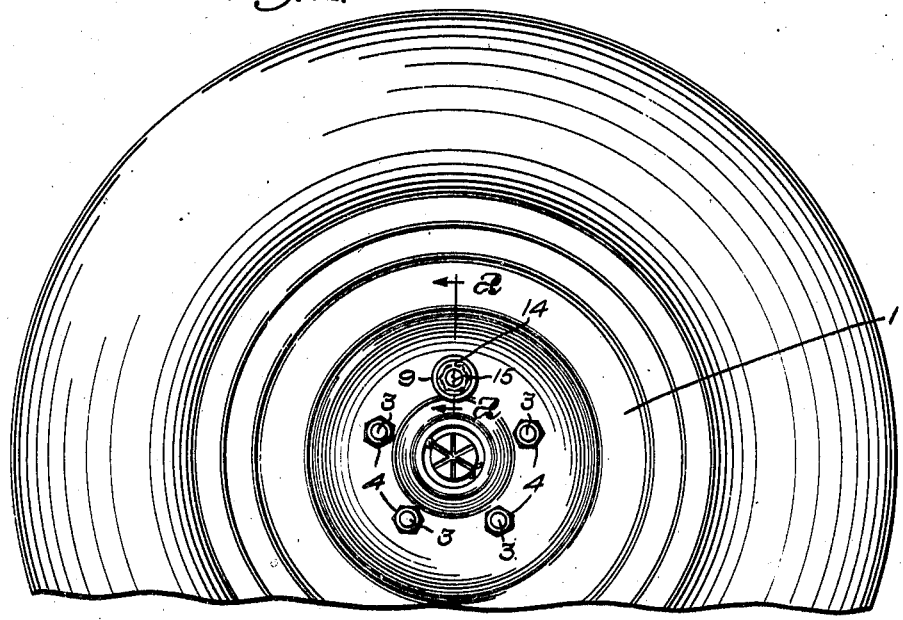
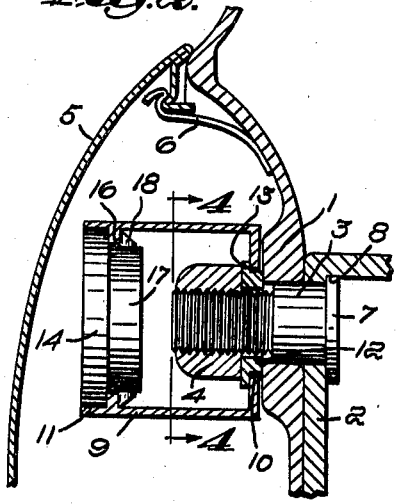
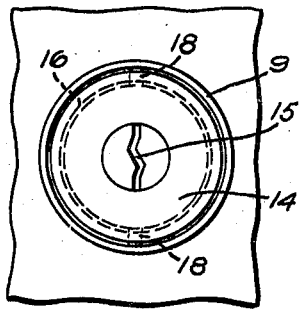
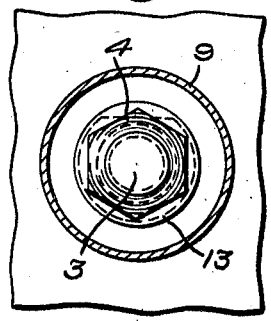
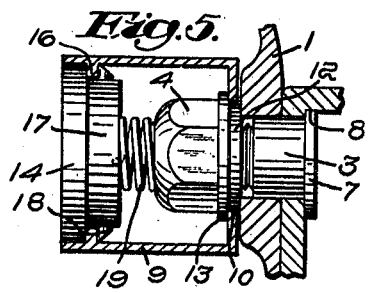
Inventor:
Roland Robbins
Attorney

UNITED STATES PATENT OFFICE 2,345,949

LOCKING DEVICE

Roland W. Robbins, Lincoln, Mass.

Application February 23, 1942, Serial No. 431,975

3 Claims. (Cl. 70—232)

This invention relates to a locking device and more especially to a locking device for preventing removal of wheels from automobiles and other vehicles.

In connection with the theft of automobile tires, there has developed a practice of removing wheels from cars, trucks, and the like. The wheels are taken away and separated from the tires at a later time. This act is one which can be more quickly and quietly carried out than the operation of removing a tire from an automobile wheel since it is necessary to release air from tires which are to be removed, and the sound of escaping air may well be a signal to the owner of the car that the theft is taking place.

An object of the invention is to provide an improved locking device for automobile wheels and to devise lock means for preventing the removal of wheels to overcome theft of tires carried out in this way. Another object of the invention is to provide a simple, cheap and efficient locking mechanism for a bolt and nut assembly where the threaded end of the bolt and the nut are ordinarily exposed.

The nature of the invention and its objects will be more readily understood from the following description of the drawings and discussion relating thereto.

In the accompanying drawing:

Fig. 1 is a fragmentary view in side elevation illustrating an automobile wheel and the locking mechanism of the invention engaged therewith.

Fig. 2 is an enlarged fragmentary cross sectional view taken on the line 2—2 of Fig. 1.

Fig. 3 is a fragmentary detail view of the locking mechanism.

Fig. 4 is a fragmentary cross sectional view taken on the line 4—4 of Fig. 2; and Fig. 5 is a fragmentary cross sectional view of a modification of the invention.

The locking device of the invention, while not limited thereto, is especially designed for use with an automobile wheel of the type which is constructed with a central disk portion adapted to be attached to a brake drum by means of bolts extending through the brake drum and projecting outwardly from the disk portion. The wheel is fastened by nuts which are threaded about the bolts from the outside of the wheel. The disk portion of the wheel carrying the bolts and nuts is usually protected by a cover which is snapped into place around the rim of the wheel. The cover, however, is required to be easily removable and therefore it provides no protection against removal of the nuts and theft of the wheel.

In Figs. 1 and 2, I have illustrated an automobile wheel, which includes a disk portion 1, mounted on a brake drum 2 and secured thereagainst by means of bolts 3 which are normally held in threaded engagement with nuts 4, bearing against the disk portion 1. Numeral 5 denotes a cover which is snapped into place around an outer rim of the disk and resiliently held by some suitable means such as the spring 6. The head of the bolt 3 is formed with a flat side 8 engaged against the brake drum 2 to prevent the bolt from turning.

In accordance with the invention, I provide a tubular covering or casing 9 which is mounted around one of the nut and bolt units employed for fastening the disk portion 1, as above described. The casing or covering generally includes housing means for receiving the extremity of a bolt member therein, and for permitting a nut to be passed through it and threaded about the bolt. There are also included locking means for closing the passageway in the casing through which the nut is inserted and removed. This prevents access to the nut unless the locking means are first removed.

Referring more in detail to the casing 9, it is preferably of cylindrical shape, having openings 10 and 11 formed at opposite ends thereof. The opening 10 is of a size adapted to permit insertion of the bolt 3 into the casing. Within the casing 9 is loosely mounted a ring member 12 which extends through the opening 10 around the bolt 3. The ring 12 is formed with a flange 13 which is adapted to overlap the inner end of the casing, and which is spaced apart from the disk portion 1 a distance greater than the thickness of the end of the casing, thereby permitting the casing to move freely around the ring member. The ring seats against the disk portion 1 and is adapted to be tightly engaged thereagainst by the nut 4 threaded about the bolt 3 within the casing 9, thus fastening the wheel to the brake drum in the usual manner (Fig. 2).

The opening 11 in the outer end of the casing 9 is of a size which permits insertion and removal of the nut 4 therethrough, and clearance is also provided for a wrench, of the socket type, being passed through the opening 11 into the casing to tighten the nut 4 to a desired point.

To close the opening 11 and thus prevent access to the nut, I have further provided a plug 14, which includes a cylindrical block 17 containing conventional locking mechanism, which is operated by a key entered in a keyhole 15 as illustrated in Fig. 3.

The plug is located within the opening 11 and rests against an annular rib portion 16 formed on the inner periphery of the casing 9. The cylindrical block 17 extends inwardly of the casing beyond the annular rib 16, to provide for plungers 18 extending radially outward therefrom across the annular rib portion 16. These plungers 18 normally remain in an outwardly extended position as shown, and thereby prevent withdrawal of the plug 14 from the casing.

Preferably a slight clearance is provided between the casing 9 and the plug 14 to permit the plug member to turn freely in the casing. The plunger members 18 are also arranged to engage tightly with the annular rib 16 to further facilitate movement of the plug around the casing.

To assemble the locking device upon an automobile wheel, the cover member 5 is first removed, then one of the nut members 4 is unthreaded from a bolt 3, and the casing 9, with the plug 14 removed, is passed over the end of the bolt 3. The ring 12 is then passed over the bolt 3 and through the opening 10 in the casing to engage against the disk portion of the wheel, and while in this position the nut 4 is passed through the casing 9 and tightly threaded about the bolt 3 by means of a socket wrench entered in the casing. Thereafter the plungers 18 in the cylindrical block 17 are retracted by turning a key in the keyhole 15, and the plug 14 is inserted into the opening 11 and seated against the annular rib 16. The plungers 18 are then released and the key withdrawn. To remove the wheel, this procedure is reversed.

It will be observed that without unlocking and removing the plug member 14, it is impossible to have access to the nut 4 and therefore this nut will continue to hold the disk portion of the wheel 1 against a brake drum 2, even though all the other nuts have been removed. The casing may be constructed of a relatively heavy durable metal which will resist attempts to break the casing or remove it in other ways than by unlocking.

A further important aspect of the invention relates to the combination of the ring element with the casing to hold the casing securely over a nut and adjacent the disk portion of the wheel, while permitting the casing to turn freely around the ring. It is pointed out that unless the casing is movable with relation to the ring, the nut and the bolt, it might be possible to apply a wrench to the casing and turn off the nut in this way. The clearance specified between the flange of the ring element and the disk portion of the wheel effectually prevents this. At the same time, the arrangement of the flange portion of the ring within the casing, in the manner shown, renders it difficult to jam the casing as by interposing a sharp edge tool between the casing and the ring.

Another feature of the invention consists in having the plug 14 rotatably mounted in the opening 11 of the casing, and also having the plungers 18 slidably engaged against the annular rib 16. This arrangement is also effective in preventing the locking mechanism from being jammed or twisted off, as for example, might be done if the plunger 18 were fixed and a screwdriver were applied in the keyhole opening 15.

In Fig. 5 I have illustrated the device of the invention provided with a spring member 19 inserted between the head of the nut 4 and the inner extremity of the cylindrical block 17. This spring member 19 is adapted to hold the plungers 18 resiliently against the annular rib 16, to prevent movement of the plug in a direction axially of the casing and thus prevent undesirable noise in the normal operation of the automobile wheel.

It is intended that other means of holding a covering or casing around a nut in a manner in which the casing is free to turn may be resorted to. It is further intended that the shape of the casing and the design of the locking mechanism may be modified in various ways to accommodate other types of wheels or other mechanism which are secured by exposed end bolts.

While I have shown a preferred embodiment of my invention, it should be understood that various changes and modifications may be resorted to, in keeping with the spirit of the invention as defined by the appended claims.

I claim:

1. In combination, a wheel, a bolt located through the wheel, a ring member located around the bolt and in spaced relation thereto and engaged against the wheel, said ring member presenting a flange portion located in spaced relation with respect to the wheel, a casing surrounding the bolt and ring member and having one side thereof rotatably secured between the flange portion and the wheel, a nut member threaded around the bolt and engaged against the said ring member, the casing having an opening formed in its outer end, an annular rib portion extending inwardly of the casing, a cylindrical block rotatably mounted against the said annular rib portion of the casing, the cylindrical block being adapted to close the opening in the casing, plunger means projecting from the cylindrical block and engaged under the said annular rib portion for the purpose of holding the cylindrical block in the casing, locking mechanism for withdrawing the plunger means from engagement with the annular rib, thereby to permit withdrawal of the cylindrical block from the casing and provide access to the said nut for removing same.

2. In combination, a wheel for spare tires, a bolt located through the wheel, a ring member located around the bolt in spaced relation thereto and seated against the wheel, said ring member presenting a flange portion which extends in spaced relation to the wheel, a nut threaded about the bolt and seated against the said flange portion of the ring member, a casing surrounding the bolt and ring member, the bottom of said casing being formed with a centrally located opening adapted to receive the said bolt therethrough, portions of the casing adjacent the said opening received between the wheel and the flanged portion of the ring member in spaced relation thereto, thereby to rotatably support the casing when the nut and bolt are tightened together, the said casing having an opening formed in its outer end, an annular rib portion extending radially inward of the casing, a cylindrical block rotatably mounted against the said annular rib portion of the casing, the cylindrical block being adapted to close the opening in the casing, plunger means projecting from the cylindrical block and engaged under the said annular rib portion for the purpose of locking the cylindrical block in the casing, locking mechanism for withdrawing the plunger means from engagement with the annular rib, thereby to permit withdrawal of the cylindrical block from the casing and provide access to the said nut for removing same.

3. A locking mechanism for a wheel comprising in combination a bolt mounted in a supporting portion of the wheel, a ring member located about the bolt in spaced relation thereto, said ring member being engaged against the supporting portion of the wheel, a nut threaded about the bolt adapted to hold the ring and the bolt in fixed relation to the supporting portion, said ring having an annular flange which extends outwardly in spaced relation to the said supporting portion of the wheel, a casing enclosing the bolt, nut and ring, said casing being formed with an annular rim which is loosely supported between the said supporting portion of the wheel and the flange of the ring, the outer end of the casing having an opening formed therein, said opening being adapted to provide access to the said nut, a cylindrical block member mounted in the outer end of the casing and locking means for removably securing the cylindrical block member in the casing.

ROLAND W. ROBBINS.